Nov. 29, 1938.   C. H. LANPHIER   2,138,606
COIL CONSTRUCTION
Filed Feb. 12, 1937
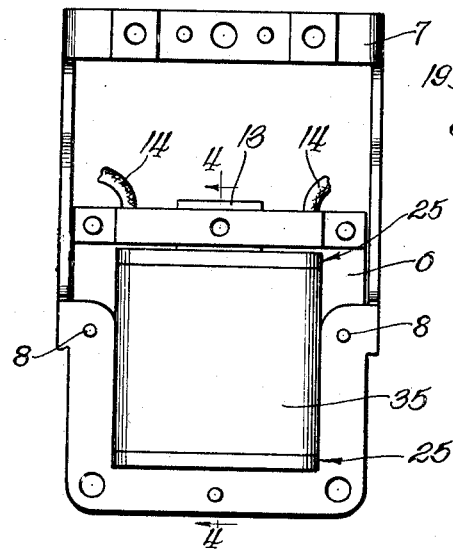
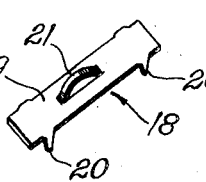
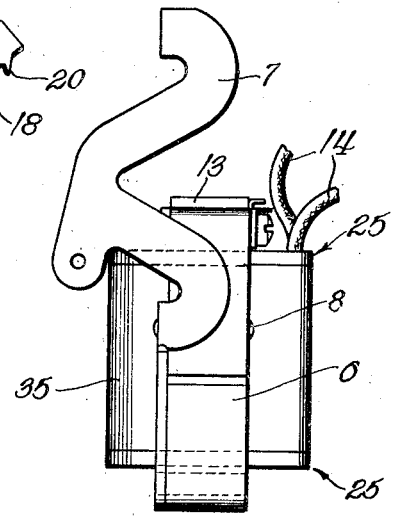
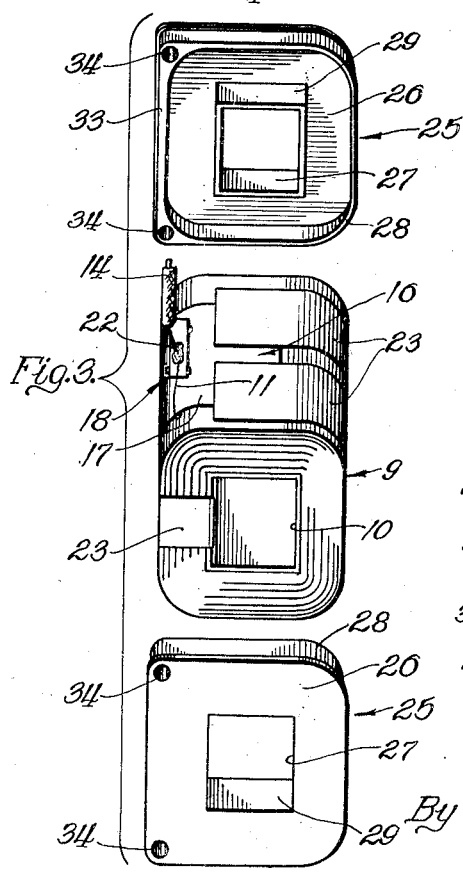
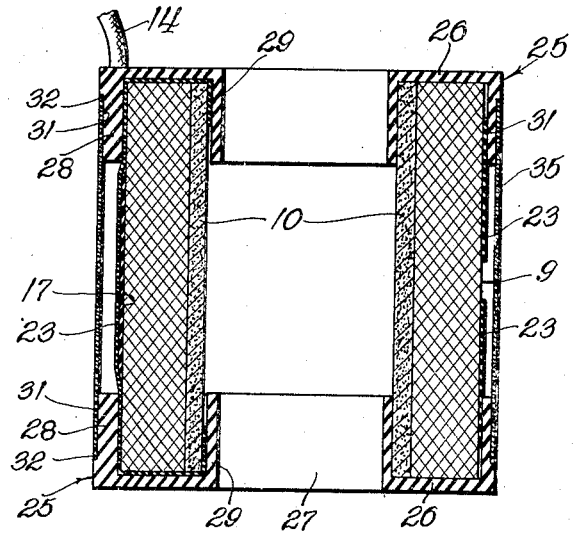
Inventor
Charles H. Lanphier
By Brown, Jackson, Boettcher & Dienner
Att'ys Patented Nov. 29, 1938

2,138,606

UNITED STATES PATENT OFFICE 2,138,606

COIL CONSTRUCTION

Charles H. Lanphier, Springfield, Ill., assignor to Sangamo Electric Company, Springfield, Ill., a corporation of Illinois Application February 12, 1937, Serial No. 125,368

1 Claim. (Cl. 175—21)

The present invention relates to coil construction, and more particularly to voltage coils adapted to be used in watt-hour meters and like electrical instruments.

The hollow fine wire voltage coils or windings that are used in connection with the laminated magnetic cores of watthour meters are so mounted in position in the instrument that it is necessary to insulate them so that no breakdown or flashover, that usually burns out the coil, will occur between the coil and the grounded parts of the meter, and manufacturers have for many years been confronted with the problem of properly insulating such coils. A study of this problem has indicated that the major weakness in these coils is near the ends where the wires are exposed to the grounded parts of the meter or at least lie adjacent to them to a degree which permits them to breakdown if not otherwise protected. Also, as these coils are exposed to view, the problem of providing proper insulation has been enhanced by the desire to provide insulating means that will be neat and attractive in appearance and of relatively low cost to manufacture. One method that has been followed in the manufacture of coils of this type has been to first apply suitable terminals to some form of anchor plate, securing the anchor plate to the coil by means of suitable adhesive tapes, and then connecting the heavier lead in wires and the ends of the fine wire winding of the coil to their respective terminals. This is followed by applying one layer of cotton tape around the outside of the whole coil which is then coated with varnish. While this method has provided reasonably good insulation, the result has been by no means neat or attractive in appearance. Another method that has been followed has been to wind the coils directly on separate insulating spools and then to apply a suitable outside covering, but such method complicates the winding procedure and makes the coil much more expensive to manufacture than is desirable.

With the above stated problem in mind, it is the principal object of the present invention to provide improved means for insulating the voltage coils of magnetic cores for watthour meters and other uses whereby the end turns of said coils are properly insulated against breakdown or flashover between the coil and the grounded parts of the meter.

It is another object of the invention to provide a pair of separable cap members of insulating material that can be fitted over the end portions of the voltage coil of a watthour meter and arranged to have a section which completely encloses the end turns of the coil both inside and outside to thereby protect the coil and prevent breakdown of the coil at such points.

It is a further object of the invention to provide improved insulating means for voltage coils for watthour meters that will be relatively inexpensive to manufacture, that can be easily and quickly applied to the coils, and that will be neat and attractive in appearance.

Other objects and advantageous features of the present invention will be apparent from the following description of the preferred embodiment thereof taken in connection with the accompanying drawing, in which—

Figure 1 is a front elevation showing the usual laminated magnetic element of a watthour meter, including a voltage coil provided with my improved insulating means in position therein;

Figure 2 is a side view of the parts shown in Figure 1;

Figure 3 is a view showing the voltage coil and the caps of insulating material that fit over the ends thereof in disassembled relation, and showing also a portion of the anchor plate and the means for holding it in position on the voltage coil;

Figure 4 is an enlarged vertical cross-sectional view through the assembled parts of the voltage coil taken on the line 4—4 of Figure 1; and Figure 5 is a perspective view, on an enlarged scale, of one of the terminals secured to the anchor plate of the coil, that are employed to connect the fine wire winding of the coil to the heavier lead in wires.

Referring to the drawing, in which only such parts of the watthour meter structure have been illustrated as are thought necessary to a complete understanding of the present invention, as shown in Figures 1 and 2, 6 indicates the usual laminated electro-magnetic element of a watthour meter, that is supported in the meter structure by means of a hanger bracket 7 of conventional construction, said element being secured to the hanger bracket by pins 8 or in any other suitable manner. The form illustrated comprises, as usual, a centrally disposed laminated pole piece 13 on which an insulated fine wire coil is mounted.

The voltage coil, which is indicated as an entirety by the reference numeral 9, comprises the usual central tubular member or spool 10 on which the winding of fine insulated wire 11 is wound in the usual manner. The bore of the spool 10 is of the proper size and shape to receive therein the central laminated pole piece 13 of the magnetic element, as is conventional in constructions of this type, and preferably both are rectangular in cross section. They may, however, be round if desired. The two ends of the fine wire winding 11 of the coil are connected to the heavier lead in wires 14 of the meter circuit by an anchor plate 16 which preferably, and in the illustrated construction, comprises a strip 17 of fiber or other suitable insulating material of U-shaped formation that extends partly around the outer surface of the coil, as shown in Figure 3, and has suitably secured thereto at spaced points thereon two terminals 18, one of which is shown in the latter figure. In Figure 5 I have illustrated one of these terminals on an enlarged scale, and as there shown it is in the form of a thin rectangular metal plate 19 provided with a small integral clip 20 adjacent each corner that extends at right angles thereto, said clips being adapted to be pushed through the strip 17 of the anchor plate from one side and bent over on the opposite side thereof to hold said terminal in position. Preferably each terminal is also provided, substantially centrally thereof, with a punched up loop portion 21 through which the end of the wire 11 of the coil, and the end of its associated lead-in wire 14, are adapted to be passed, after which the wires are soldered to the terminal, as shown at 22 in Figure 3. The anchor plate 16 may conveniently be held in position on the coil by a plurality of strips of adhesive tape 23, or other suitable material, wrapped partly around the coil both transversely and longitudinally as shown in Figure 3.

I have found that if the end turns of the coil are suitably insulated, the other parts of the coil can be sufficiently spaced from the meter structure so as to give relatively high insulation against breakdown, and, therefore, in order to adequately insulate and prevent breakdown of the coil at the end portions thereof I enclose each end in a suitably shaped cap or cover member 25 that is adapted to fit closely over the end portion of the coil, as shown in Figure 4, said cap members being molded from suitable insulating material such as "Bakelite", or the like. Each cap member 25 comprises a flat annular base portion 26 that, in the illustrated design, is of substantially square configuration and provided with a central opening 27 of proper size and shape to receive the central pole piece 13. Also it preferably has rounded corners to conform in shape to that of the periphery of the end of the coil 9, as best shown in Figure 3. The base portion 26 is provided around the margin and around the central opening with outer and inner flanges 28, 29 that are adapted, respectively, to fit closely over the outer and inner end portions of the coil. Thus an annular channel is provided in the cap to receive the end portion of the coil, whereby its end turns are completely enclosed and effectively insulated. The outer flange 28 overlaps the outer end portion of the coil and the inner flange 29 extends thereinto and registers with the end of the spool 10. By this means the entire end portion of the coil, both inside and outside, is adequately insulated and protected.

As shown in Figures 3 and 4, one side wall of the outer flange 28 of the cap is made somewhat thicker than the other side walls thereof, as indicated at 33, and the opposite ends of said wall 33 are each provided with an opening 34 extending therethrough, through which the two lead-in wires 14 that are connected with the ends of the wire 11 of the coil, as above described, are inserted.

The outer flange 28 has its outer surface adjacent its free edge recessed, as shown at 31, in order to provide a shoulder 32 at the opposite edge near where it joins the base portion 26, as best shown in Figure 4. As also shown in said figure, a wrapping of paper or suitable insulating material, indicated by 35, is wrapped around the coil between the shoulders 32 of the two end caps, such insulating material being cemented to the outer recessed surfaces 31 of the end caps. Thus the voltage coil is completely enclosed in a suitable and neat insulating wrapper which not only gives the coil a neat appearance but also provides for adequate insulation under all conditions, at a minimum of cost.

By providing the insulating end caps 25 as above described the end portions of the voltage coil are adequately protected against breakdown under all ordinary operating conditions, including high voltage tests, etc. With such a construction also it is possible to utilize the ordinary multiple wound coil wherein a large number of coils are wound on a single mandrel and afterwards removed and cut to proper length, and this method of producing the coils reduces the cost of manufacture considerably.

The method of assembling my improved voltage coil for application to a laminated magnetic core will now be described. The anchor plate 16 is first applied to the coil and secured in position thereon by the tape strips 23, after which the coil is given a coat of varnish. Then the two end caps 25 are applied to the coil. Each lead-in wire 14 is then inserted through its appropriate opening 34 in one or the other of the end caps and said lead in wires 14 and the two ends of the fine wire 11 of the coil are then passed under the loops 21 of their respective terminals 18 to which they are then soldered as above described. After the two caps 25 have been placed in position and the wires connected as described, the final wrapping of paper or other insulating material 35 is wrapped around the coil between the shoulders 32 of the caps 25 and cemented to the outer recessed surfaces 31 of said caps. After this final wrapper has been applied the entire coil is given another coat of varnish and is ready to be applied to the magnetic core.

By the construction above described I have provided a voltage coil for watthour meters that is not only inexpensive to manufacture, but one that will be completely insulated against breakdown and will also present a neat and attractive appearance.

I claim:

As a new article of manufacture, a voltage coil for a watthour meter comprising, in combination, a tubular member on which the turns of the coil are disposed substantially to the ends thereof, a cap member at each end of the coil having an inner flange extending into and fitting snugly with each inner end portion of said tubular member and an outer flange extending over the adjacent outer end portion of the coil, said inner and outer flanges being integrally formed with an intermediate flat portion whereby the outer flanges form a rigid frame around the coil, each outer flange being slightly recessed externally to provide shoulders facing each other, a wrapper of insulating material of a thickness substantially the same as the depth of the recess in each outer flange surrounding said frame and spaced from said coil and secured in the recess in each flange with its edges abutting said shoulders, at least two corners of one of said outer flanges being thickened and each having an aperture therein extending longitudinally thereof, and lead-in wires connected to the terminals of the coil and extending through said apertures.

CHARLES H. LANPHIER.